(12) United States Patent
Moros Ortiz et al.

(10) Patent No.: US 11,076,192 B1
(45) Date of Patent: Jul. 27, 2021

(54) IDENTIFYING AND CALIBRATING INTERNET OF THINGS (IOT) DEVICES TO ENHANCE CONTENT CONSUMPTION EXPERIENCE

(71) Applicant: INTERNATIONAL BUSINESS MACHINES CORPORATION, Armonk, NY (US)

(72) Inventors: Jorge Andres Moros Ortiz, Melbourne (AU); Suman Sedai, Hughesdale (AU); Noel Faux, Melbourne (AU); Hidemasa Muta, Edithvale (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/744,271

(22) Filed: Jan. 16, 2020

(51) Int. Cl.
| | |
|---|---|
| H04N 21/41 | (2011.01) |
| H04N 21/442 | (2011.01) |
| H04N 21/45 | (2011.01) |
| G06F 16/9535 | (2019.01) |
| G06F 16/23 | (2019.01) |
| G06F 16/735 | (2019.01) |

(52) U.S. Cl.
CPC ..... H04N 21/4131 (2013.01); G06F 16/2379 (2019.01); G06F 16/735 (2019.01); G06F 16/9535 (2019.01); H04N 21/44218 (2013.01); H04N 21/4532 (2013.01)

(58) Field of Classification Search
CPC ......... H04N 21/4131; H04N 21/44218; H04N 21/4532; G06F 16/2379; G06F 16/735; G06F 16/9535

USPC .......................................................... 725/10
See application file for complete search history.

(56) References Cited

U.S. PATENT DOCUMENTS

| | | |
|---|---|---|
| 9,197,918 B2 | 11/2015 | Li et al. |
| 9,918,144 B2 | 3/2018 | Mickelsen et al. |
| 9,996,535 B1 * | 6/2018 | Skidmore ............... G06F 16/93 |
| 2003/0097664 A1 | 5/2003 | Meyers et al. |
| 2005/0020359 A1 | 1/2005 | Ackley et al. |

(Continued)

OTHER PUBLICATIONS

DELOITTE.com "2019 Global health care outlook Shaping the Future" retrieved from: https://www2.deloitte.com/.../Life-Sciences-Health-Care/gx-lshc-hc-outlook-2019.pdf; 2019; 41 pgs.

(Continued)

Primary Examiner — Dominic D Saltarelli
(74) Attorney, Agent, or Firm — Cantor Colburn LLP; Joseph Petrokaitis (57) ABSTRACT

Aspects of the invention include obtaining data regarding a plurality of devices in a viewing environment and analyzing a content item to be displayed in the viewing environment. Aspects also include identifying an interaction between a scene of the content item and at least one of the plurality of devices based at least in part upon the analyzing and identifying a viewer in the viewing environment and obtaining a user profile for the viewer. Based upon the interaction and the user profile, aspect include activating the at least one of the plurality of devices during playback of the scene. Aspects further include monitoring one or more characteristics of the viewer during playback of the scene and updating the user profile for the viewer based on the one or more characteristics.

20 Claims, 5 Drawing Sheets

(56) References Cited

U.S. PATENT DOCUMENTS

| | | | |
|---|---|---|---|
| 2006/0242592 | A1 | 10/2006 | Edwards et al. |
| 2012/0291059 | A1 | 11/2012 | Roberts et al. |
| 2015/0118670 | A1 | 4/2015 | Jespersen et al. |
| 2016/0059079 | A1 | 3/2016 | Watterson |
| 2016/0227294 | A1 | 8/2016 | Liekens et al. |
| 2017/0257664 | A1 | 9/2017 | Tam et al. |
| 2018/0077463 | A1 | 3/2018 | Merchant |
| 2018/0279012 | A1 | 9/2018 | Carter et al. |
| 2020/0204390 | A1* | 6/2020 | Bekampis .............. H04L 67/306 |
| 2020/0213662 | A1* | 7/2020 | Wolcott ........... H04N 21/42202 |
| 2020/0401621 | A1* | 12/2020 | Bender ................... G06F 16/71 |

OTHER PUBLICATIONS

DELOITTE.com "2019 Media & Entertainment Industry Outlook a new world of content and advertising possibilities" Interview with Kevin Westcott, retrieved from: https://www2.deloitte.com/.../us-tmt-2019-media-and-entertainment-industry-outlook.pdf; 2019; 8 pgs.

DELOITTE.com "2020 Telecommunications, media, and entertainment outlook", retrieved from: https://www2.deloitte.com/.../media-and-entertainment-industry-outlook-trends.html; 2019; 8 pgs.

IoTLineup.com "Overview of the Most Popular Smart Home Devices"; retrieved from: http://iotlineup.com/; downloaded Dec. 2, 2019; 39 pgs.

Mell, Peter et al. "The NIST Definition of Cloud Computing—Recommendations of the National Institute of Standards and Technology" Special Publication 800-145; Sep. 2011; 7 pgs.

Singular DTV "30 Stats that Reveal the Economics of the Entertainment Industry", retrieved from: https://medium.com/singulardtv/30statsthatrevealtheeconomicsoftheentertainmentindustry18e9a5db493b; dated Aug. 9, 2018; 9 pgs.

Zion Market Research "U.S. Education Market Will Reach USD 2,040 billion by 2026: Zion Market Research" retrieved from: https://globenewswire.com/news-release/2018/04/09/1466926/0/en/U-S-Education-Market-Will-Reach-USD-2-040-billion-by-2026-Zion-Market-Research.html; dated Apr. 9, 2018; 4 pgs.

\* cited by examiner

IDENTIFYING AND CALIBRATING INTERNET OF THINGS (IOT) DEVICES TO ENHANCE CONTENT CONSUMPTION EXPERIENCE

BACKGROUND

The present invention generally relates to enhancing a user experience during content consumption, and more specifically, to identifying and calibrating internet of things (IOT) devices to enhance a user experience during content consumption.

People of all ages consume media contents on a variety of devices, such as televisions, tablets, smartphones and the like. In addition, there has been a proliferation of internet of things (IOT) devices, such as speakers, lights, cameras, and the like. Recently, efforts have been made to enhance the user experience during content consumption by utilizing IOT devices.

SUMMARY

Embodiments of the present invention are directed to a computer-implemented method for identifying and calibrating internet of things (IOT) devices to enhance user experience during content consumption. A non-limiting example computer-implemented method includes obtaining data regarding a plurality of devices in a viewing environment and analyzing a content item to be displayed in the viewing environment. The method also includes identifying an interaction between a scene of the content item and at least one of the plurality of devices based at least in part upon the analyzing and identifying a viewer in the viewing environment and obtaining a user profile for the viewer. Based upon the interaction and the user profile, the method includes activating the at least one of the plurality of devices during playback of the scene. The method further includes monitoring one or more characteristics of the viewer during playback of the scene and updating the user profile for the viewer based on the one or more characteristics.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide methods, systems, and computer program products for identifying and calibrating internet of things (IoT) devices to enhance a user experience during content consumption. In accordance with one or more embodiments of the present invention, before or during playback of a content item, an identification of the IoT devices disposed near a viewer and the characteristics of each IoT device are obtained. Based on an analysis of the content item, potential interactions between portions of the content item, also referred to as scenes, and the IoT devices are identified. During playback of the scene, the IoT devices associated with the interactions are activated based on a user profile and the response of the viewer is monitored. In exemplary embodiments, the user profile of the viewer is updated based on the monitored response of the viewer during the interaction.

Figure 1:
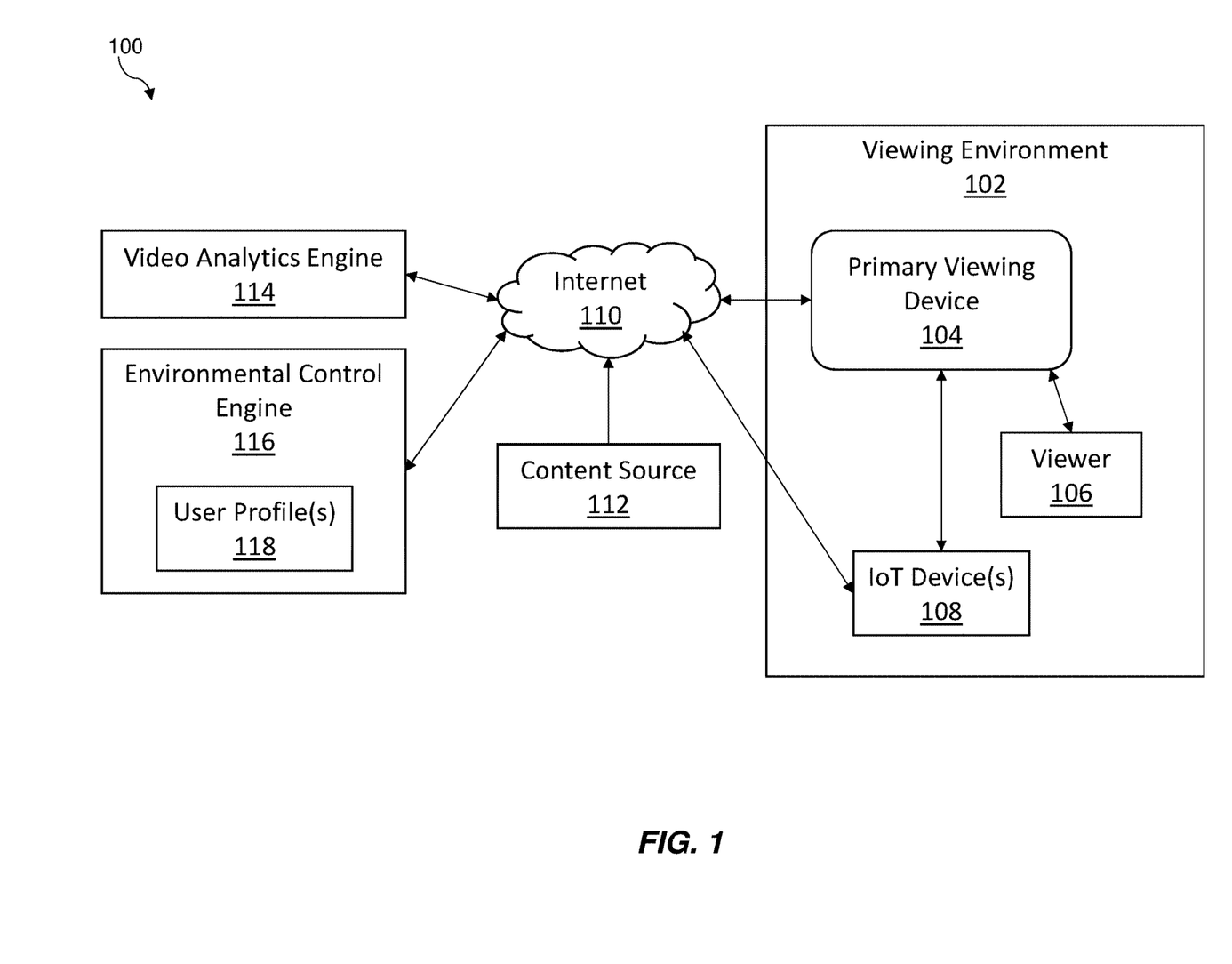
FIG. 1 a block diagram of a system for identifying and calibrating internet of things (IoT) devices according to one or more embodiments of the present invention.

FIG. 1 depicts a block diagram of a system for identifying and calibrating internet of things (IoT) devices according to one or more embodiments of the present invention. As illustrated, the system 100 includes a viewing environment 102, which includes a primary viewing device 104 being watched by a viewer 106. The viewing environment 102 also includes a plurality of IoT devices 108. The primary viewing device 104 is one of a television, tablet, smartphone or the like which the viewer 106 is utilizing to view a content item. The IoT devices 108 include one or more of a smart speaker, a light, a camera, a doorbell, a thermostat, or the like that is connected to the Internet 110 and that is disposed within, or in close proximity to, the viewing environment 102.

The primary viewing device 104 is configured to obtain a content item from a content source 112 via the Internet 110. The system 100 also includes a video analytics engine 114 that is configured to analyze content items obtained from the content source 112 that will be displayed on the primary viewing device 104. In exemplary embodiments, the video analytics engine 114 is configured to use natural language processing to analyze a script of the content item, to use image analytics to analyze images extracted from the content item, and to identify potential interactions between different types of IoT devices with scenes of the content item. The video analytics engine 118 includes IoT devices interactions database and the mapping that tells which device is suitable for a particular type of scene, an actor's action and the possible actions of the viewer. For some interactions, no response may be required from the viewer, for example, when the function of the target device corresponds to "change in lighting condition" or "change in the sound type/location" etc.

The system 100 also includes an environmental control engine 116 that is configured to communicate with the video analytics engine 114, the primary viewing device 104, and the IoT devices 108. The video analytics engine 114 is configured to receive the potential interactions identified from the video analytics engine 114 and to determine which of the potential interactions to act on based on the user profile 118 of the viewer 106. During playback of a scene of the content item by the primary viewing device 104, the environmental control engine 116 is configured to instruct one or more of the IoT devices 108 to take specific actions that are based on the user profiles 118. Furthermore, the environmental control engine 116 is configured to monitor one or more characteristics of the viewer 106, using one or more IoT devices 108, during playback of the scene. Based on the one or more characteristics, the environmental control engine 116 updates the user profile 118. In exemplary embodiments, the user profile 118 for a view includes an identification of all of the available IoT devices 108 in the viewing environment 102 and an indication of their location relative to the viewer 106. In exemplary embodiments, the one or more characteristics of the viewer 106 include a movement of a user, a change in a facial expression of the user, a heart rate of the user, and the like.

Figure 4:
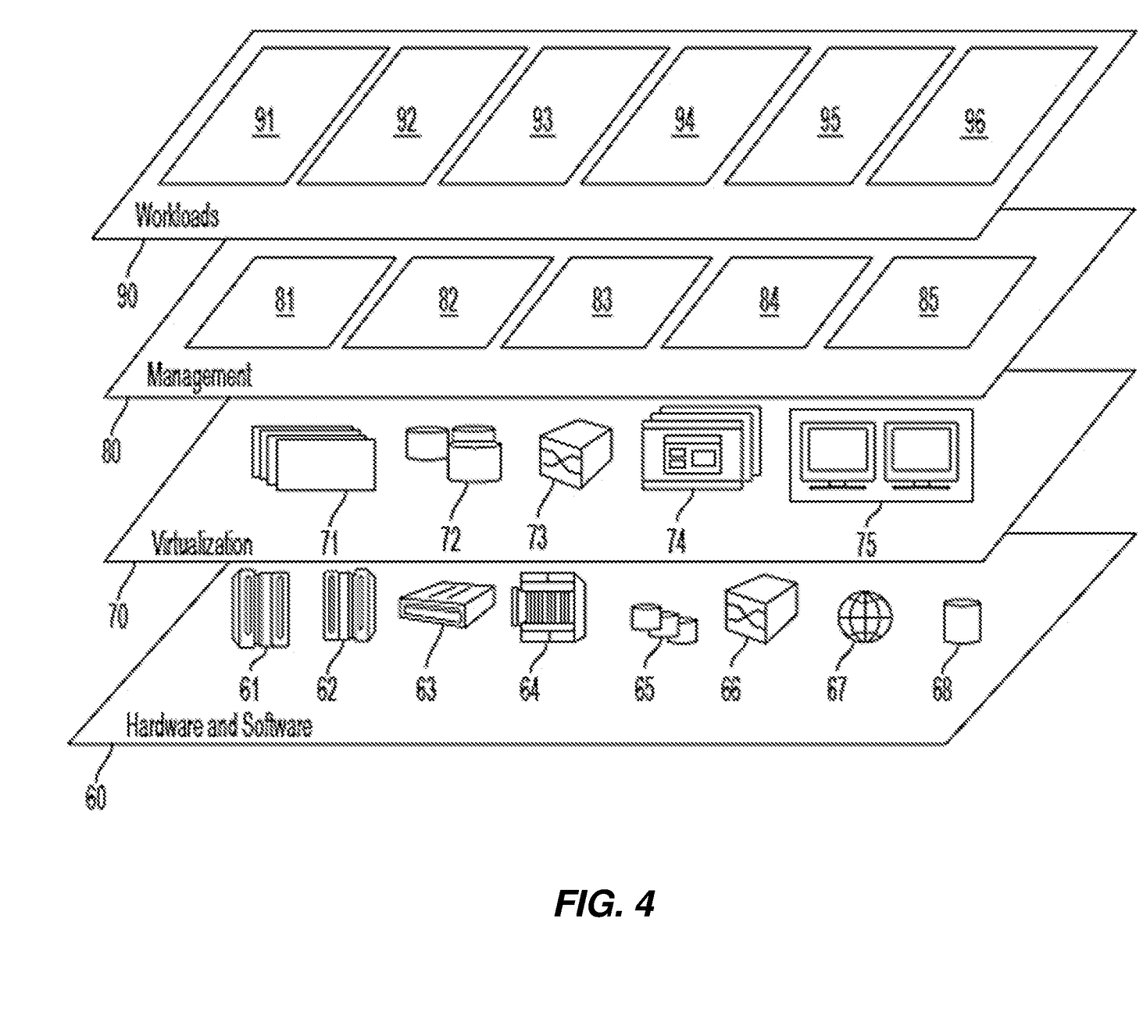
FIG. 4 depicts abstraction model layers according to one or more embodiments of the present invention.
Figure 5:
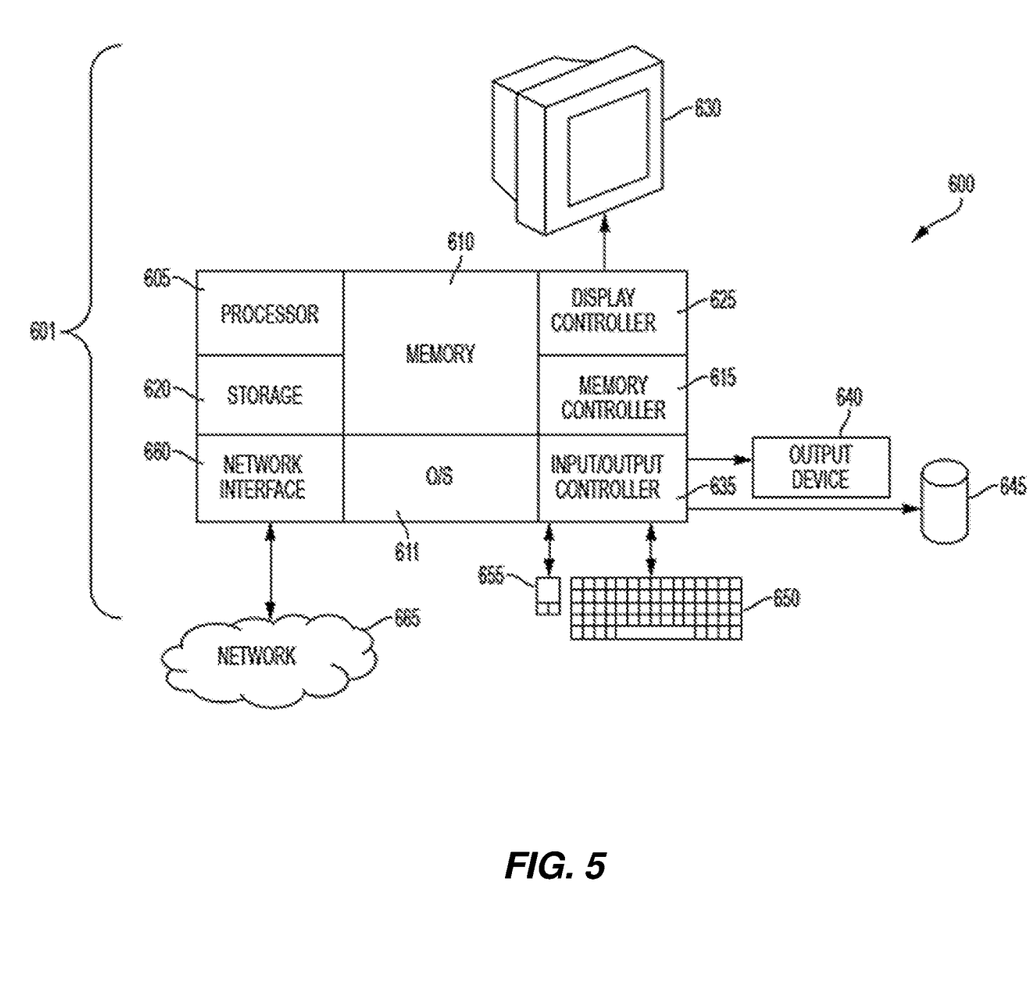
FIG. 5 illustrates a processing system for linking copied code according to one or more embodiments of the present invention.

In exemplary embodiments, the video analytics engine 114 and environmental control engine 116 shown in FIG. 1 may be performed by software executed by an operating system, such as OS 611 of FIG. 5, executing on a computer processor. The computer processor can be a standalone processor or a node in a cloud, such as node 10 in FIG. 4.

In one example, a viewer is watching a movie on the primary viewing device and an IoT autonomous vacuum cleaner is instructed to move in a pattern relevant to the movie story by the environmental control engine. The user is then asked to move in the same pattern as the vacuum cleaner. In some embodiments, the user must move in the same pattern in order for the movie to move to the next scene. The movement of the user is monitored and the user profile can be updated based on, for example, the speed of the user's movement. Accordingly, the speed of the movement of the IoT autonomous vacuum cleaner during the next interaction will be adjusted based on the expected speed of the user.

In another example, a horror movie or game is being displayed on the primary viewing device and a character in the movie/game turns on/off a lamp. In this case, the environmental control engine turns on/off the lamps in the viewing environment to enhance the viewing/gaming experience. In a further example, during a movie scene, a character rings a doorbell, based on determining that one of the IoT devices in the viewing area is a doorbell chime, the doorbell chime is activated when the doorbell is rung in the movie to provide a more immersive experience.

Figure 2:
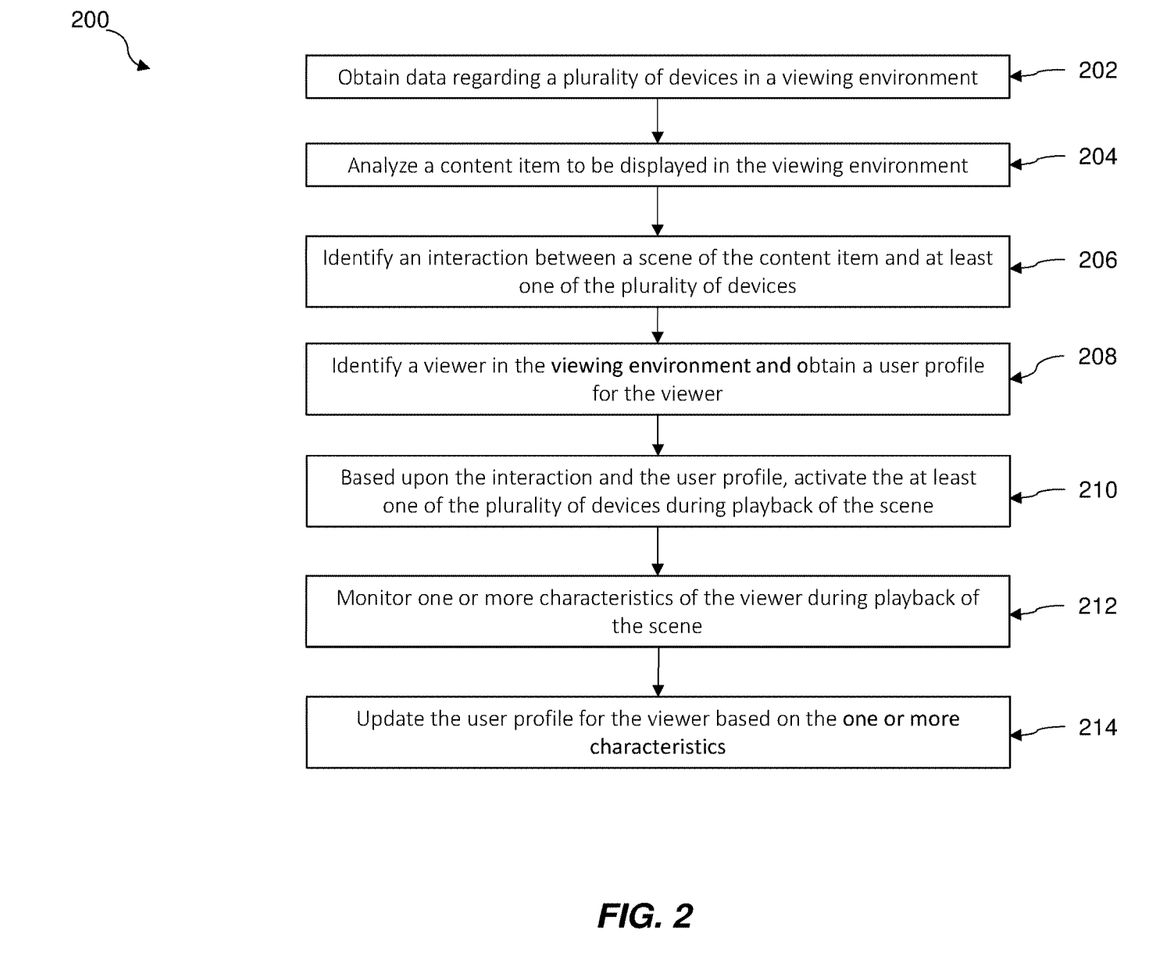
FIG. 2 depicts a flow diagram of a method for identifying and calibrating IoT devices to enhance user experience during content consumption according to one or more embodiments of the present invention.

Turning now to FIG. 2, a flow diagram of a method 200 for identifying and calibrating Internet of things (IoT) devices to enhance user experience during content consumption is generally shown in accordance with one or more embodiments of the present invention. The method 200 shown in FIG. 2 may be executed by an operating system, such as OS 611 of FIG. 6, executing on a computer processor. The computer processor can be a standalone processor or a node in a cloud, such as node 10 in FIG. 5.

As shown at block 202, the method 200 includes obtaining data regarding a plurality of devices in a viewing environment. The data includes one or more actions that each of the plurality of devices are capable of performing, a location of each of the plurality of devices in the viewing environment, and one or more adjustable parameters associated with the actions that each of the plurality of devices are capable of performing. Next, as shown at block 204, the method 200 includes analyzing a content item to be displayed in the viewing environment. In exemplary embodiments, analyzing the content item includes performing one or more of natural language processing on a script of the content item and image analysis on images extracted from the content item. The method 200 also includes identifying an interaction between a scene of the content item and at least one of the plurality of devices based at least in part upon the analyzing, as shown at block 206.

Continuing with reference to FIG. 2, the method 200 also includes identifying a viewer in the viewing environment and obtaining a user profile for the viewer. In one embodiment, the viewer is identified using facial recognition, as shown at block 208. In another embodiment, the viewer is identified based on the viewer signing into an application on the primary viewing device. In exemplary embodiments, the user profile includes user preferences regarding each of the plurality of devices in the viewing environment. The user preferences include whether to enable actions that each of the plurality of devices are capable of performing and one or more limits on the actions. The one or more limits on the actions can include limits on speed, volume, duration and the like on the actions that the devices perform.

Next, as shown at block 210, the method 200 includes activating the at least one of the plurality of devices during playback of the scene based upon the interaction and the user profile. In exemplary embodiments, activating the at least one of the plurality of devices during playback of the scene includes instruction the at least one of the plurality of devices to perform an action and providing one or more qualitative settings relating to the action. For example, play a sound at a specified volume level, activate a light at a specified color, a specified brightness for a specified duration of time. The method 200 also includes monitoring one or more characteristics of the viewer during playback of the scene, as shown at block 212. The one or more characteristics of the viewer include one or more of a movement of the viewer, a change in facial expression of the viewer, and a biometric measurement, such as heart rate, of the viewer. The method 200 concludes at block 214 by updating the user profile for the viewer based on the one or more characteristics.

In exemplary embodiments, the identified interactions and actions taken by the IoT devices are configured to encourage physical activity by the viewer. For example, the system may ask the viewer to imitate the action of an actor and monitor whether the viewer's movement is similar to the actor's movement. In one embodiment, the movement of the user is tracked using an IoT camera. In one embodiment, if the user has opted out for video-based motion tracking or if an IoT camera is not present, a motion sensor-based tracking can be used.

In exemplary embodiments, the viewer interaction, as well as physiological signals, are collected by the environmental control engine and compared against those of other user's in order to calibrate the system's response. The environmental control engine is configured to record previous user interaction and remember previous interactions in order to maintain the user profile for interaction. In exemplary embodiments, the viewer is able to access and control their user profile in order to control how, and how often, the IoT devices are used through the digital media contents.

In exemplary embodiments, the historical actions of the viewer are used to create a baseline of interaction response which is adjusted by the environmental control engine in real-time in response to monitored viewer behavior. For example, when a user responds actively (above the baseline medium), this will result in the environmental control engine calibrating its interaction with the user and difficulty so that it reflects the users and in turn offers a more immersive experience. In one example, the environmental control engine observes that the viewer moves slowly in comparison to other user's that watched this movie and followed a particular interaction. This slowness is considered for future scenes. If the user had difficulty with speech, the system will prioritize other types of interaction with IoT devices, in order to customize the experience per user abilities.

Although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
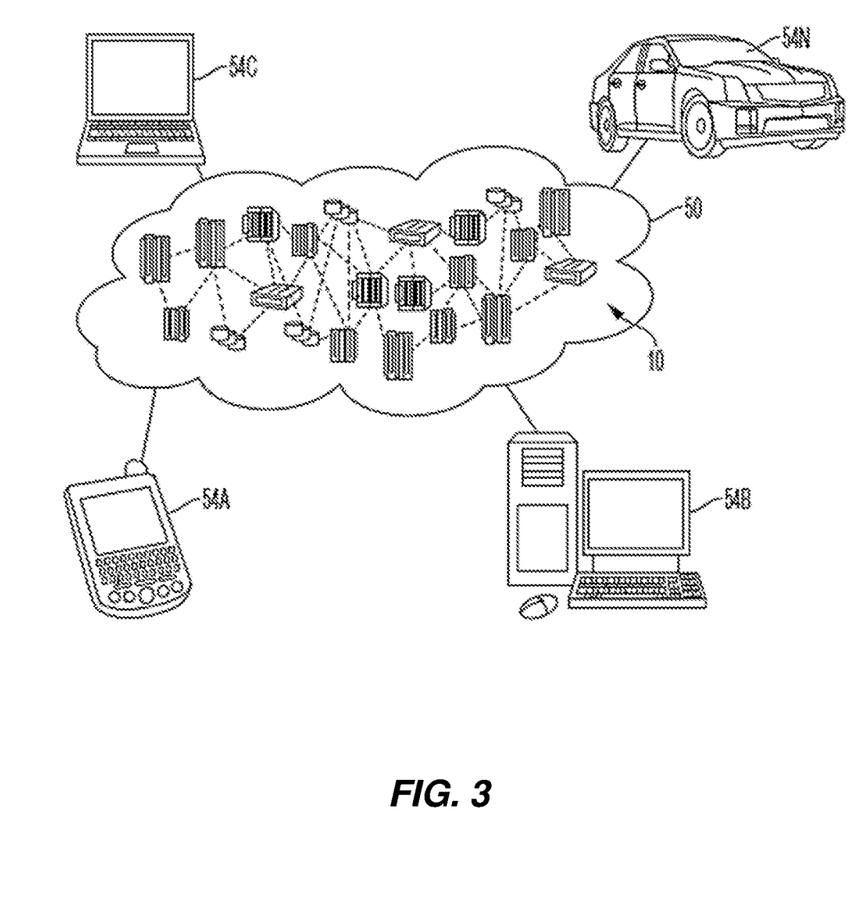
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced content consumption 96.

It is understood that one or more embodiments of the present invention are capable of being implemented in conjunction with any type of computing environment now known or later developed.

Turning now to FIG. 5, a computer system is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 5, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 5, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying and calibrating internet of things devices to enhance a user experience during content consumption, the method comprising:
    obtaining data regarding a plurality of devices in a viewing environment;
    analyzing a content item to be displayed in the viewing environment, wherein the analyzing includes performing natural language processing on a script of the content item;
    identifying an interaction between a scene of the content item and at least one of the plurality of devices based at least in part upon the analyzing;
    identifying a viewer in the viewing environment and obtaining a user profile for the viewer;
    based upon the interaction and the user profile, activating the at least one of the plurality of devices during playback of the scene;
    monitoring one or more characteristics of the viewer during playback of the scene; and
    updating the user profile for the viewer based on the one or more characteristics.

2. The computer-implemented method of claim 1, wherein the data regarding the plurality of devices includes one or more actions that each of the plurality of devices are capable of performing.

3. The computer-implemented method of claim 1, wherein the analyzing further includes performing image analysis on images extracted from the content item.

4. The computer-implemented method of claim 1, wherein the user profile includes user preferences regarding each of the plurality of devices in the viewing environment.

5. The computer-implemented method of claim 1, wherein the user preferences include whether to enable actions that each of the plurality of devices are capable of performing and one or more limits on the actions.

6. The computer-implemented method of claim 1, wherein activating the at least one of the plurality of devices during playback of the scene includes instructing the at least one of the plurality of devices to perform an action.

7. The computer-implemented method of claim 1, wherein the one or more characteristics of the viewer includes one or more of a movement of the viewer, a change in facial expression of the viewer, and a biometric measurement of the viewer.

8. A system comprising:
    one or more processors for executing computer-readable instructions, the computer-readable instructions controlling the one or more processors to perform operations comprising:
        obtaining data regarding a plurality of devices in a viewing environment;
        analyzing a content item to be displayed in the viewing environment, wherein the analyzing includes performing natural language processing on a script of the content item;
        identifying an interaction between a scene of the content item and at least one of the plurality of devices based at least in part upon the analyzing;
        identifying a viewer in the viewing environment and obtaining a user profile for the viewer;
        based upon the interaction and the user profile, activating the at least one of the plurality of devices during playback of the scene;
        monitoring one or more characteristics of the viewer during playback of the scene; and
        updating the user profile for the viewer based on the one or more characteristics.

9. The system of claim 8, wherein the data regarding the plurality of devices includes one or more actions that each of the plurality of devices are capable of performing.

10. The system of claim 8, wherein the analyzing further includes performing image analysis on images extracted from the content item.

11. The system of claim 8, wherein the user profile includes user preferences regarding each of the plurality of devices in the viewing environment.

12. The system of claim 8, wherein the user preferences include whether to enable actions that each of the plurality of devices are capable of performing and one or more limits on the actions.

13. The system of claim 8, wherein activating the at least one of the plurality of devices during playback of the scene includes instructing the at least one of the plurality of devices to perform an action.

14. The system of claim 8, wherein the one or more characteristics of the viewer includes one or more of a movement of the viewer, a change in facial expression of the viewer, and a biometric measurement of the viewer.

15. A computer program product comprising a computer-readable storage medium having program instructions embodied therewith, the program instructions executable by a processor to cause the processor to perform operations comprising:
    obtaining data regarding a plurality of devices in a viewing environment;
    analyzing a content item to be displayed in the viewing environment, wherein the analyzing includes performing natural language processing on a script of the content item;
    identifying an interaction between a scene of the content item and at least one of the plurality of devices based at least in part upon the analyzing;
    identifying a viewer in the viewing environment and obtaining a user profile for the viewer;
    based upon the interaction and the user profile, activating the at least one of the plurality of devices during playback of the scene;
    monitoring one or more characteristics of the viewer during playback of the scene; and
    updating the user profile for the viewer based on the one or more characteristics.

16. The computer program product of claim 15, wherein the data regarding the plurality of devices includes one or more actions that each of the plurality of devices are capable of performing.

17. The computer program product of claim 15, wherein the analyzing further includes performing image analysis on images extracted from the content item.

18. The computer program product of claim 15, wherein the user profile includes user preferences regarding each of the plurality of devices in the viewing environment.

19. The computer program product of claim 15, wherein the user preferences include whether to enable actions that each of the plurality of devices are capable of performing and one or more limits on the actions.

20. The computer program product of claim 15, wherein activating the at least one of the plurality of devices during playback of the scene includes instructing the at least one of the plurality of devices to perform an action.

* * * * *